(12) United States Patent
Khazanov

(10) Patent No.: US 8,700,353 B2
(45) Date of Patent: Apr. 15, 2014

(54) MEMS ACCELEROMETER DEVICE

(75) Inventor: Yuri Khazanov, Northbrook, IL (US)

(73) Assignee: InCheck Technologies, Inc., Northbrook, IL (US)

( * ) Notice: Subject to any disclaimer, the term of this patent is extended or adjusted under 35 U.S.C. 154(b) by 345 days.

(21) Appl. No.: 13/117,883

(22) Filed: May 27, 2011

(65) Prior Publication Data

US 2011/0295546 A1    Dec. 1, 2011

Related U.S. Application Data

(60) Provisional application No. 61/349,014, filed on May 27, 2010.

(51) Int. Cl.
*G01P 1/02* (2006.01)
(52) U.S. Cl.
CPC ..................................... *G01P 1/023* (2013.01)
USPC ........................................................ 702/141
(58) Field of Classification Search
CPC ...................................................... G01P 1/023
USPC ........................................................ 702/141
See application file for complete search history.

(56) References Cited

U.S. PATENT DOCUMENTS

| | | | |
|---|---|---|---|
| 7,578,184 B2* | 8/2009 | Fontanella et al. | 73/488 |
| 2008/0125701 A1* | 5/2008 | Moberg et al. | 604/67 |
| 2010/0024518 A1* | 2/2010 | Radziszewski et al. | 73/7 |

OTHER PUBLICATIONS

Printout of the internet Tech Support pages for PCB Piezotronics, Inc., dated May 26, 2011.

* cited by examiner

*Primary Examiner* — Bryan Bui
(74) *Attorney, Agent, or Firm* — Greer, Burns & Crain, Ltd.

(57) ABSTRACT

A MEMS accelerometer device for use with a machine having a housing with a threaded aperture, and an external data acquisition system, the device including a stud defining a chamber and having a threaded body configured to fasten into the threaded aperture, a printed circuit board disposed in the chamber, an accelerometer sensor chip mounted on and electrically connected to the printed circuit board, and a communication device electrically connected to the printed circuit board and configured for providing measurement data to the data acquisition system.

20 Claims, 14 Drawing Sheets

MEMS ACCELEROMETER DEVICE

FIELD

The present application relates generally to micro-electromechanical system (MEMS) sensors, and more particularly to MEMS accelerometers.

BACKGROUND

In industrial facilities, regardless of the product being produced, machines are often installed to perform specific tasks. To confirm that these machines are working properly, sensors and other related monitoring devices are used to gather and present data regarding the operation or condition of the machines.

One type of sensor is an accelerometer, which measures acceleration of a machine's vibration. Industrial accelerometers have traditionally been mechanical (i.e. using a piezoelectric element and a proof mass assembled within a sensor body wherein when the mass is accelerated, it impacts a force on the crystal that is proportional to the mass and the acceleration, resulting in the crystal outputting an electrical signal). MEMS accelerometers have been available in recent years and are used in various applications. In a MEMS accelerometer, the sensing mechanical assembly is micro machined within a microchip that also contains electronic components. These accelerometers have rarely been used for machine monitoring due to their limited frequency range. However, recently MEMS accelerometers have been manufactured that are capable of high-frequency measurements suitable for industrial applications.

FIG. 1 shows an example of a traditional mechanical accelerometer device 2 having a mounting stud 4 installed in a device threaded hole 6. The device 2 is then mounted to the side of the machine 8 by having the stud 4 engage a machine threaded hole 9. However, by mounting externally on the side of the machine 8, the device 2 relies on a precisely machined surface to maintain an adequately rigid position or connection to the machine. Further, in these systems, the device 2 is relatively bulky and often located relatively far from the vibration transmitting components. For these reasons, the device 2 often provides unreliable measurements.

MEMS accelerometers are typically manufactured in a microchip format and therefore require being installed on a printed circuit board. In machines that have printed circuit boards, such as a motor controller built into a motor, the location of the printed circuit board is typically unrelated to an optimal position of the sensor. Further, many industrial machines have no electronic components at all, and therefore lack a convenient and appropriate location for the accelerometer. As such, in these traditional systems, it is difficult to mount a MEMS accelerometer and obtain reliable measurements.

SUMMARY

In an effort to address the above-identified drawbacks, the present accelerometer device includes a printed circuit board (PCB) having an accelerometer chip, both of which are enclosed in a stud having a body that is configured such that it can be fastened or otherwise mounted into an aperture of a machine housing to secure the device to the machine.

The present device provides several advantages over traditional accelerometers (i.e., mechanical accelerometers and control-board mounted MEMS accelerometers). For example, first the present device is small in size since it does not need a physical mechanical assembly. Second, the present device provides improved accelerometer accuracy, with sensitivity falling approximately within the range of up to +/−2% of the nominal value. Third, the present device provides an accelerometer that maintains accuracy in a wide operating temperature range. Fourth, the present device provides for easy installation on or within machine housing. Fifth, the present device provides improved accuracy of measurements for machines having uneven surfaces. Sixth, the present device provides accurate internal machine temperature measurements. Seventh, in the present device, the sensor electrical ground is isolated from the sensor body, reducing common measurement problems.

More specifically, A MEMS accelerometer device is provided for use with a machine having a housing with a threaded aperture, and an external data acquisition system, the device including a stud defining a chamber and having a threaded body configured to fasten into the threaded aperture, a PCB disposed in the chamber, an accelerometer sensor chip mounted on and electrically connected to the PCB, and a communication device electrically connected to the PCB and configured for providing measurement data to the data acquisition system.

DETAILED DESCRIPTION

Figure 1:
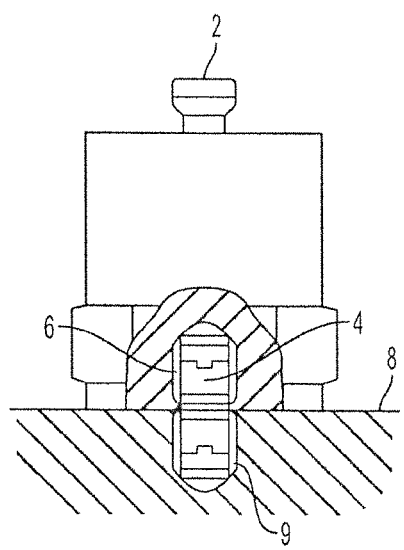
FIG. 1 is a front view of an embodiment of a prior art accelerometer device.
Figure 2:
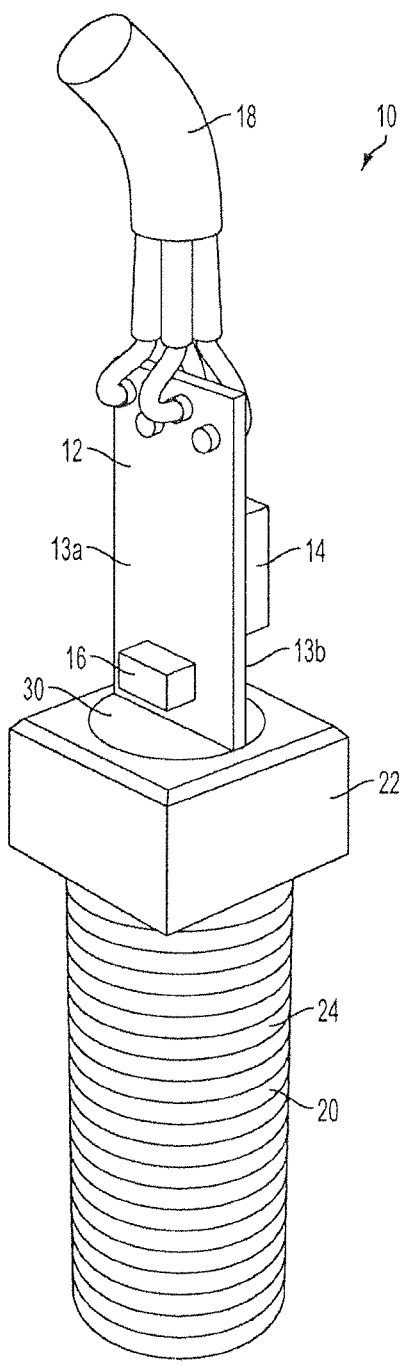
FIG. 2 is an exploded front perspective view of a first embodiment of the present MEMS accelerometer device.

Throughout this disclosure, any reference to a, an, or the, refers to at least one. Referring now to FIGS. 2-5, a first embodiment of the present MEMS accelerometer device 10 is shown. Included in the device 10 is a printed circuit board (PCB) 12 on which an accelerometer sensor chip 14 and preferably a temperature sensor chip 16 are mounted and electrically connected. Throughout this application, a chip refers to a semiconductor, integrated circuit, a set of electronic components on a single unit, or any other similar electronic device that carries out a specified operation. In the example embodiment shown in FIG. 2, the temperature sensor chip 16 and accelerometer sensor chip 14 and are mounted on opposite surfaces 13a, 13b of the PCB 12, but notably the invention is not limited to such a specific configuration.

A cable 18 is attached at one end to the PCB 12 (e.g., by soldering or the like to electrically communicate with the sensors chips 14, 16), and is configured to be attached at a second end to an external (outside the device 10) data acquisition system 19 (FIG. 6) for storing, calculating, analyzing, and/or outputting the data gathered from the accelerometer sensor chip 14 and the temperature chip 16. It is also contemplated that the device 10 uses other wired or wireless communication devices aside from a cable, including for example a wireless transmitter (e.g., a radio) to transmit the measurement data to a wireless receiver coupled to the data acquisition system 19, thereby alleviating the need for a cable to be attached to the device 10.

Figure 3:
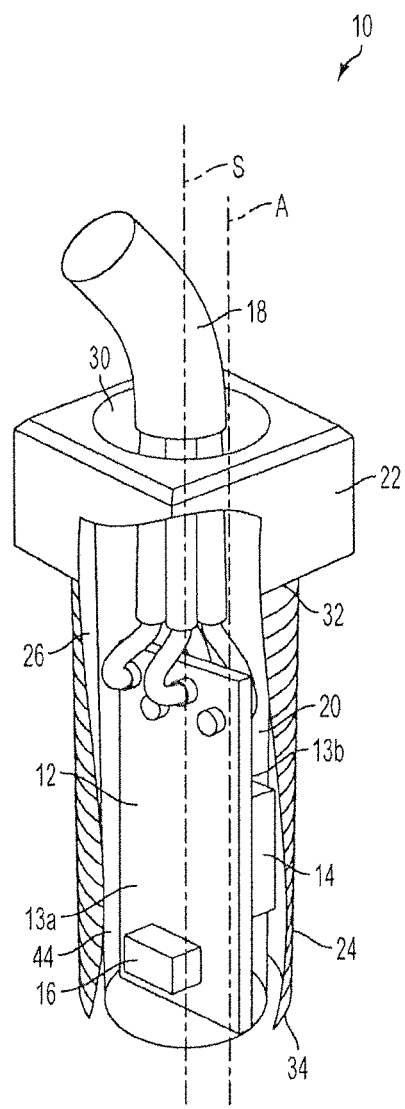
FIG. 3 is a front perspective view of the device of FIG. 2, with portions of the stud body cutaway for clarity.
Figure 4:
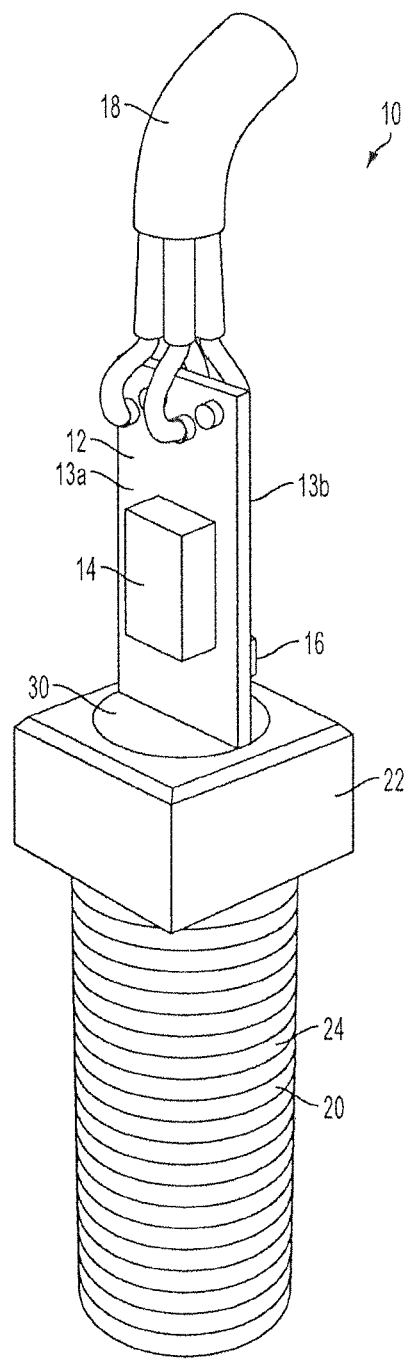
FIG. 4 is an exploded rear perspective view of the device of FIG. 2.
Figure 5:
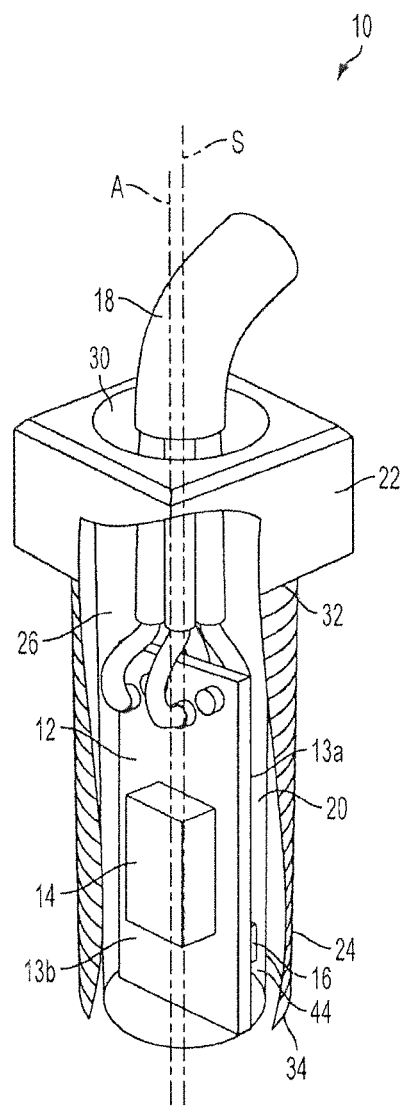
FIG. 5 is a rear perspective view of the device of FIG. 2, with portions of the stud body cutaway for clarity.
Figure 6:
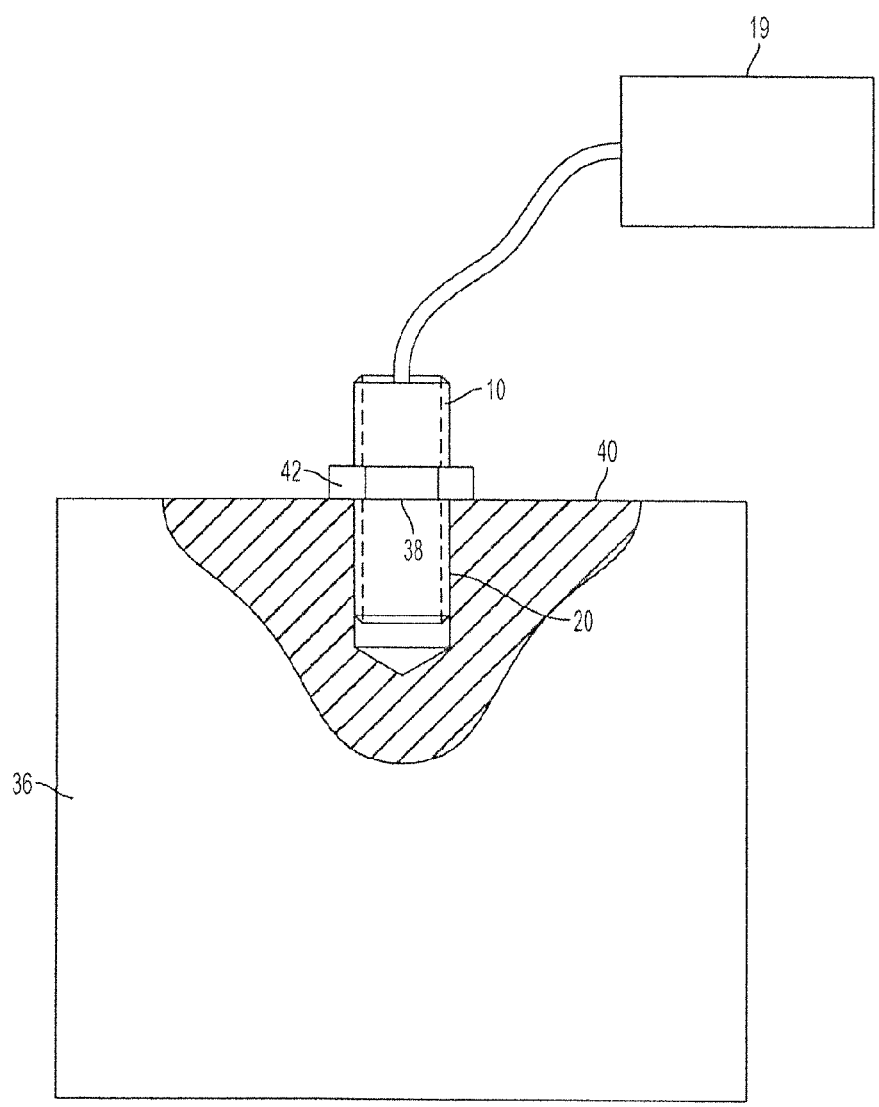
FIG. 6 is a side view of the device of FIG. 2 mounted on a machine.
Figure 7:
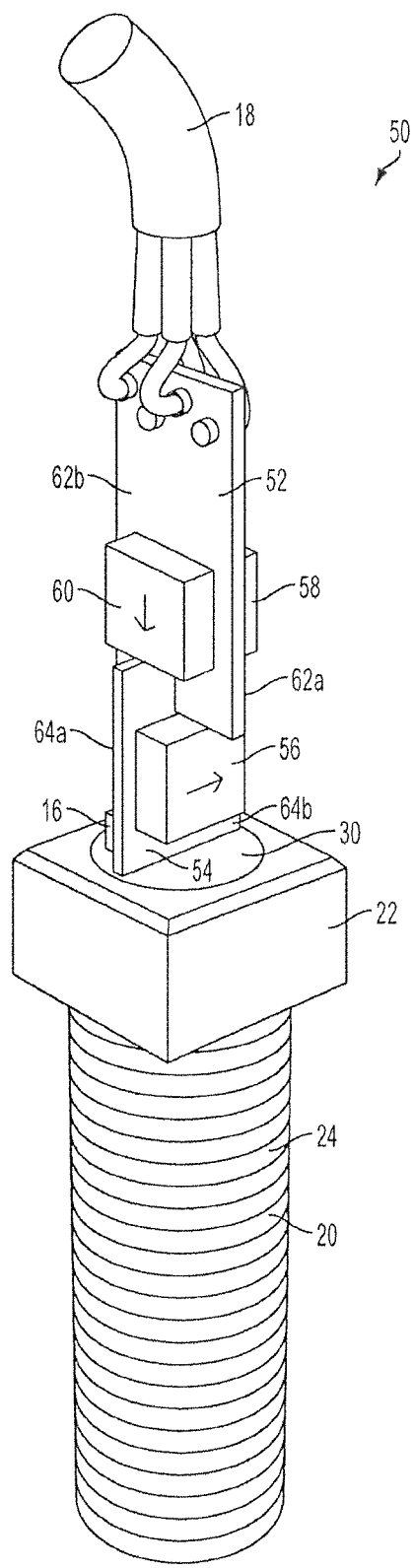
FIG. 7 is an exploded front perspective view of a second embodiment of the present MEMS accelerometer device.
Figure 8:
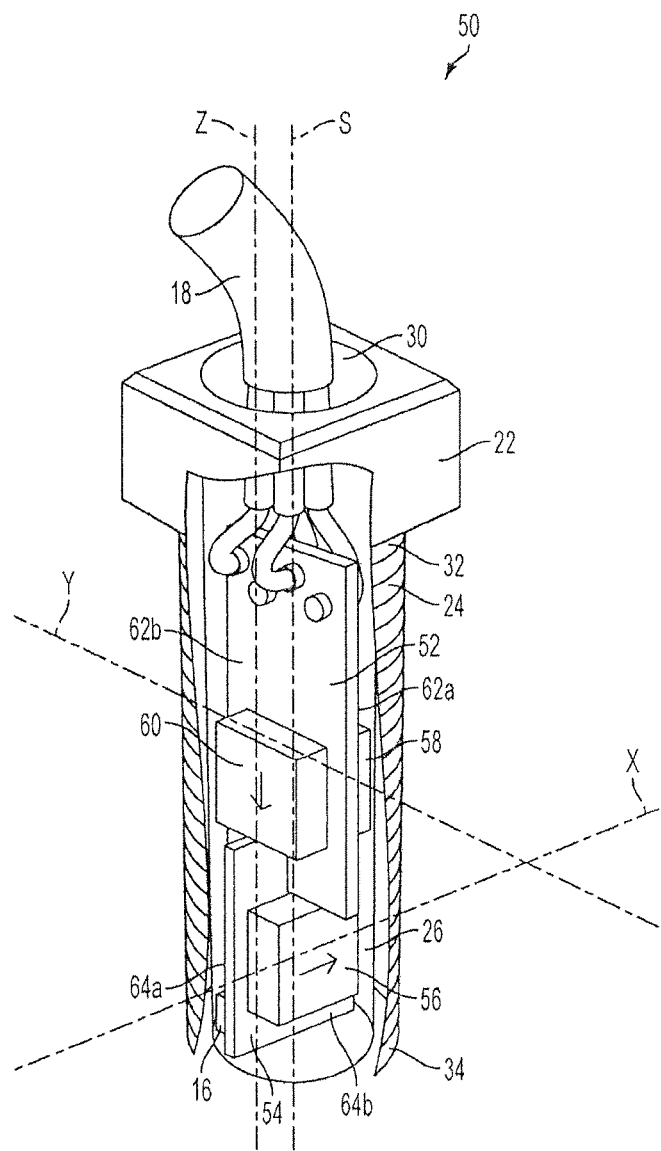
FIG. 8 is a front perspective view of the device of FIG. 7, with portions of the stud body cutaway for clarity.

The MEMS accelerometer device 10 further includes a stud 20 having a means for applying torque by a tool, a non-limiting example of which is a square-shaped head 22, and further having a threaded body 24 defining a chamber 26. Preferably, the stud 20 is approximately ⅜" is diameter, although varying sizes are considered. An opening 30 in the head 22 provides fluid communication through an upper end 32 of the body 24 to the chamber 26 such that the PCB 12 can be passed through the opening and mounted within the chamber with the cable 18 extending back through the opening for attachment to the data acquisition system 19 (FIG. 6). The internal diameter of the chamber 26 is preferably configured to grippingly receive and retain the PCB 12 within the chamber (FIGS. 3 and 5). The lower end 34 of the body 24 is closed, although it is also contemplated that it be opened or partially opened.

Also, preferably the PCB 12 and the opening 30 are sized such that when the PCB is inserted through the opening, the PCB aligns parallel to a longitudinal axis S of the stud 20 (FIGS. 3 and 5) because the width of the PCB it slightly smaller than the internal diameter of the opening 30. This automatic alignment feature ensures that the axis of sensitivity of the accelerometer chip 14 is aligned with the stud 30 of the device 10.

As shown in FIG. 6, the MEMS accelerometer device 10 is configured for being secured to a machine 36 by fastening (e.g., screwing) the threaded body 24 of the stud 20 into a complementary threaded aperture 38 on a housing 40 of the machine. Preferably, the device 10 is further secured to the machine 36 by use of a threaded jam nut 42, which engages the threaded body 24 and tightens the stud 20 against the housing 40 of the machine 36. The cable 18 connects the PCB 12 to the data acquisition system 19.

In an alternative embodiment, where it is not desired that an opening be made in the housing 40 of the machine 36, the jam nut 42 is affixed to the housing by an alternative means (e.g., by using an adhesive). The device is then similarly secured to the machine 36 by fastening the threaded body 24 of the stud 20 into a threaded portion of the jam nut 42. In yet another embodiment, a mounting pad (not shown) is used in place of, or in addition to a jam nut to secure the device 10. The mounting pad is similar to the jam nut, except that it has a larger surface area, which provides for an improved ability to affix the mounting pad (e.g., using an adhesive) to the housing 40 of the machine 36. In yet another embodiment, the device 10 is secured to the 36 machine by fastening the threaded body 24 of the stud 20 into a magnet base (not shown) attached to the machine 36.

It is also contemplated that the stud 20 not include a head, and that body 24 not be threaded. In such an embodiment, the device is preferably installed into the aperture 38 (which need not be threaded) of the housing 40 using an adhesive or other appropriate material.

Referring again to FIGS. 2-5, the device 10 is preferably configured such that, when installed, the axis A of sensitivity of the accelerometer sensor chip 14 is aligned parallel to the longitudinal axis S of the stud body 24 as depicted in FIGS. 3 and 5 (and/or parallel to a longitudinal axis of the threaded aperture 38). Therefore, regardless of the rotational position of the device 10, the accelerometer sensor chip 14 is vertically aligned. Further, the accelerometer sensor chip 14 is mounted on the PCB 12, which is positioned within the stud 20 via a tight fit into the chamber 26. As such, the position of the accelerometer sensor chip 14 is substantially secured in its position relative to the machine 36, thereby reducing the chances for misalignment leading to inaccurate measurements.

Notably, a traditional mechanical accelerometer would require a piezoelectric crystal and a proof mass to measure acceleration, which physically are relatively large compared to the accelerometer sensor chip 14. In a preferred embodiment, the accelerometer sensor chip 14 is approximately only 5 mm×5 mm×2 mm. As such, the present MEMS accelerometer device 10 is smaller than traditional mechanical accelerometers. In addition, use of the accelerometer sensor chip 14 provides for sensitivity variability of approximately +/−2% of the nominal value (i.e., the percentage difference between the output of a sensor and the actual value being measured). This is an improvement over mechanical accelerometers, which typically provide sensitivity in the range of +/−20%. Notably, +/−5% is generally considered the best range in the industry. Further, since the sensitivity of the present device 10 varies so little, less frequent and potentially no calibration is needed to maintain the present device.

Another benefit provided with the present MEMS accelerometer device 10 is that the accelerometer readings are not appreciably sensitive to a change in temperature. Indeed, the piezoelectric crystals used in mechanical accelerometers are sensitive to a change in temperature which is common in typical industrial settings (often ranging between about −40 Celsius and 85 degrees Celsius). The accelerometer sensor chip 14 however, as used in the present device 10, is not sensitive to such temperature changes.

The present MEMS accelerometer device 10 also provides for easy and effective installation and more reliable measurements. Indeed, the entire device 10 is integrated within a stud 20, which is mountable within an aperture 38 of the housing 40 of the machine 36. This provides a particular benefit when the device 10 is being installed on a machine 36 having a housing 40 with an uneven surface. Since the accelerometer sensor chip 14 is integrated with the stud 20 being fastened on the housing 40 of the machine 36, vibrations from the machine are less likely to cause the device 10 to become loosely attached to the machine and result in less accurate measurements. This benefit is further advanced by the use of the jam nut 42, which secures the position of the stud 24. The stud can also be easily oriented in the desired way (i.e., to align the appropriate axes), before the jam nut 42 is locked into place.

To the contrary, when using traditional accelerometer devices, the sensing portion is separate from the stud portion (it is included in a metal enclosure attached to the housing), and therefore is susceptible to losing a rigid connection to the machine despite the stud being secured into the aperture of the machine housing (FIG. 1). Traditional accelerometer devices may also suffer from "ground loops," which are created when the electrical ground of the sensor is connected to the ground of the machine, which leads to measurement errors. A special, more expensive enclosure or an adapter is sometimes required to electrically isolate the accelerometer from the machine. This problem is reduced however with the present device 10, since the device is configured such that the accelerometer sensor chip 14 is electrically isolated from the machine 36.

The present device 10 also provides for less complex and more accurate temperature sensing. Temperature sensors in traditional devices are typically mounted on the outside surface of a machine's housing or utilize a flexible rod or other contraption to dip below the surface of a machine's housing to gather temperature data from within the housing. In the present device, the temperature sensor chip 16 is preferably disposed in a lower portion 44 of the chamber 26 (near the lower end 34 of the and stud 20), such that once the stud is installed, the temperature sensor chip is positioned inside the machine 36, and therefore a dedicated opening for a separate temperature sensor and the extra sensor are not needed to obtain temperature readings with a high degree of accuracy.

Referring now to FIGS. 7-10, a second preferred embodiment of the present MEMS accelerometer device 50 is shown. The second embodiment device 50 is similar to the first embodiment device 10, except that the PCB 12 includes a first portion 52 and a second portion 54, and three accelerometer chips 56, 58, 60 are included instead of one to measure acceleration along three mutually perpendicular axes (the remaining features are identified using the same numerical references used above in the first embodiment device 10).

Figure 9:
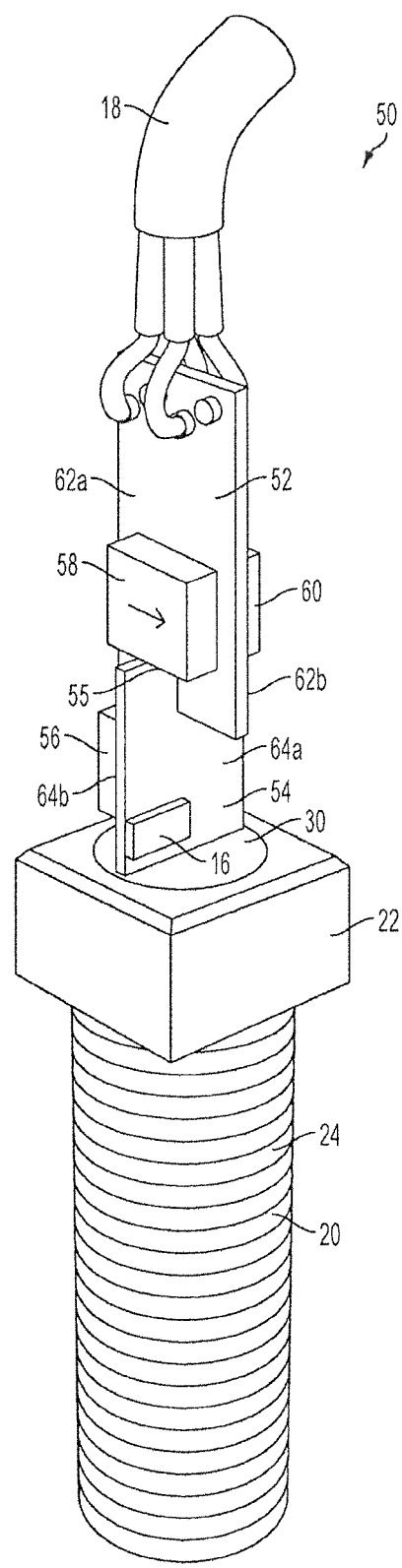
FIG. 9 is an exploded rear perspective view of the device of FIG. 7.
Figure 10:
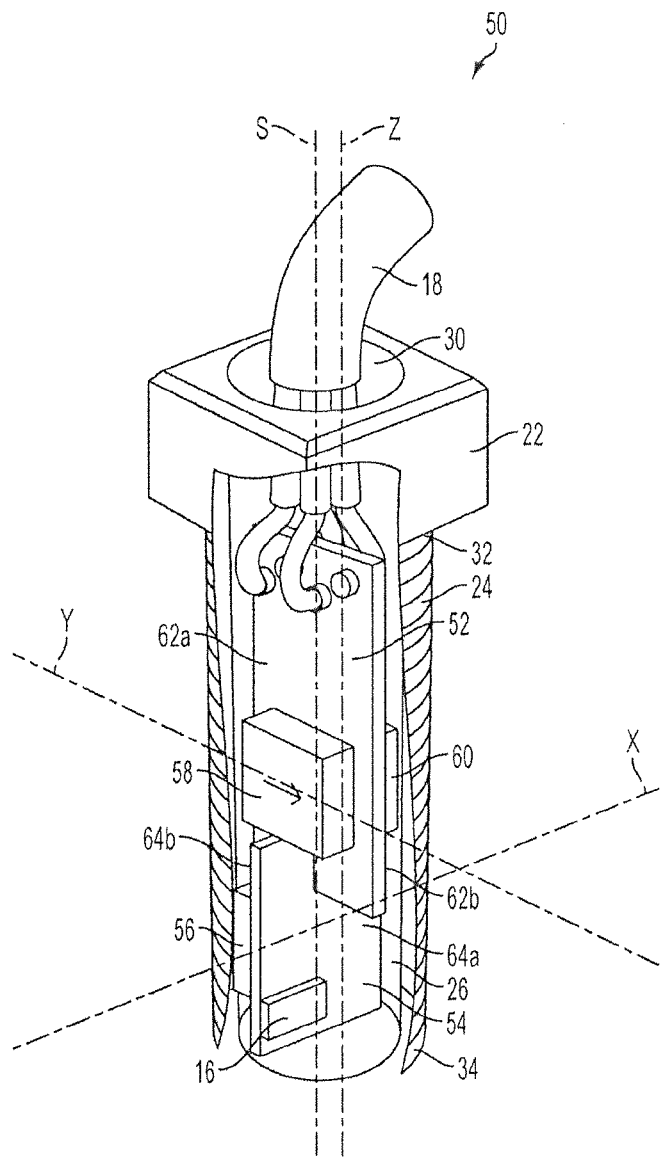
FIG. 10 is a rear perspective view of the device of FIG. 7, with portions of the stud body cutaway for clarity.
Figure 11:
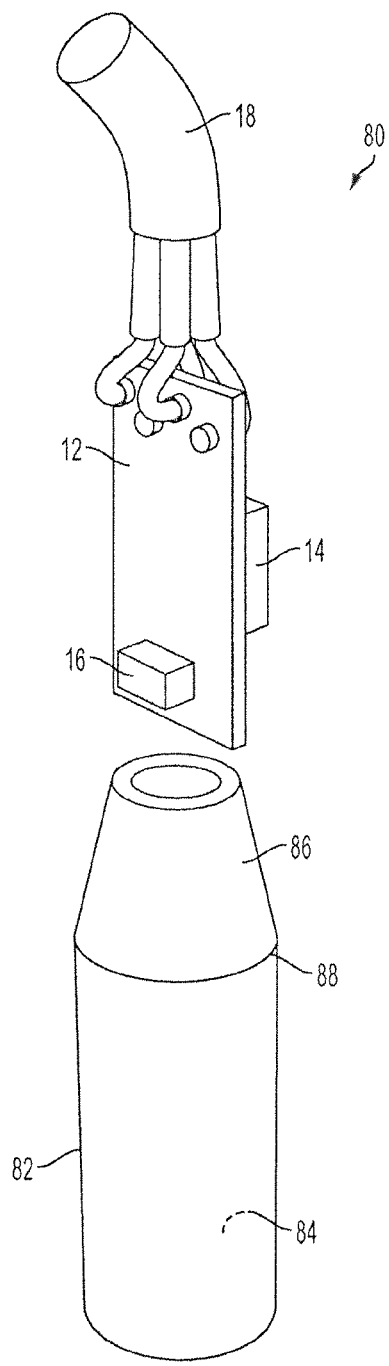
FIG. 11 is an exploded front perspective view of a third embodiment of the present MEMS accelerometer device.

As shown in FIGS. 7-10, preferably the first PCB 52 and second PCB 54 are disposed such that their respective planes of each portion (defined by their surfaces) are generally transverse to each other and are configured for complementally engagement with each other at an interlocking juncture 55 (shown approximately in FIG. 9). As described above, the present MEMS accelerometer device 50 includes separate accelerometer chips 56, 58, 60 to measure acceleration in each of the X, Y, and Z directions, respectively (shown in the FIGS. 8 and 10 with X, Y, and Z axes). The Y and Z accelerometer sensor chips 58, 60 are disposed on opposite surfaces 62a, 62b of the PCB first portion 52, and the X accelerometer sensor chip 56 is disposed on the PCB second portion 54 (temperature sensor chip 16 and the X accelerometer sensor chip 56 are disposed on opposite surfaces 64a, 64b). It is also contemplated that the present device 50 uses a single accelerometer sensor chip designed to measure three directions, in which case, only a single PCB 12 would be used.

Notably, a traditional mechanical accelerometer would require three crystals to measure acceleration in three directions, which results in a relatively larger device. As such, the present device 50 is physically smaller than traditional devices capable of providing similar measurements. It should be noted that while specific numbers, positions and orientations of the PCB portions 52, 54 and their respective surfaces, and accelerometer sensor chips 56, 58, 60 have been described in an example embodiment, other modified configurations are also considered.

Figure 12:
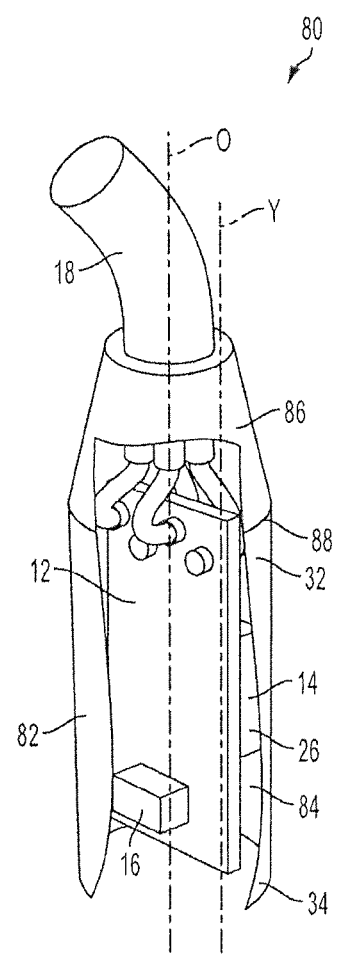
FIG. 12 is a front perspective view of the device of FIG. 11, with portions of the stud body cutaway for clarity.
Figure 13:
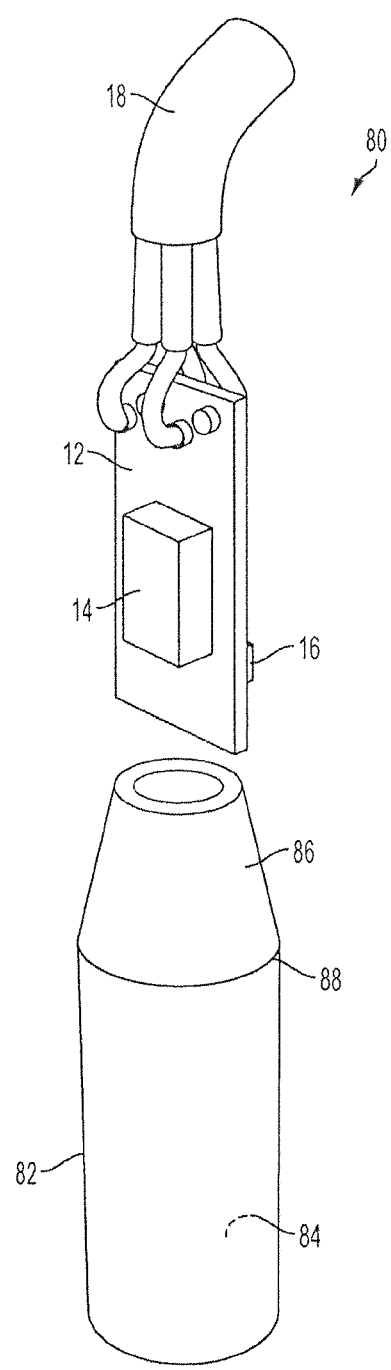
FIG. 13 is an exploded rear perspective view of the device of FIG. 11.
Figure 14:
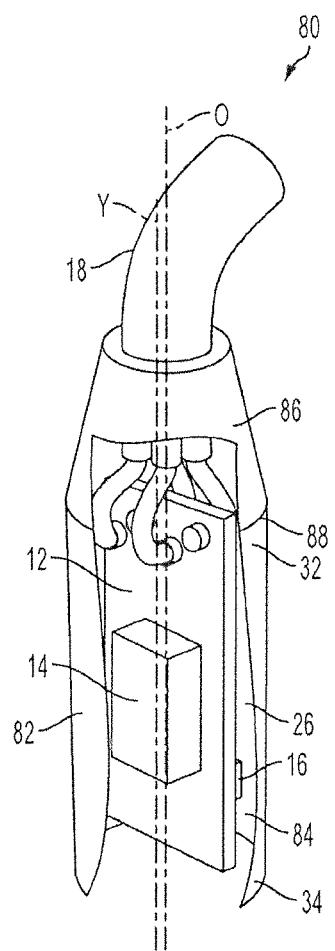
FIG. 14 is a rear perspective view of the device of FIG. 11, with portions of the stud body cutaway for clarity.

Referring now to FIGS. 11-14, a third preferred embodiment of the present MEMS accelerometer device 80 is shown. The third embodiment device 80 is similar to the first embodiment device 10, except that instead of a threaded body 24, the PCB 12 is encapsulated into a resin, plastic or other suitable material thus forming an overmolding 82 defining a chamber 84 (a longitudinal axis O of the overmolding 82 is also shown in FIGS. 12 and 14). Further, the device 80 includes a grommet 86 with a slot 88 that is in fluid communication with the chamber 84, and through which the cable 18 runs (as with the head 22 in the first embodiment device 10) to reduce strain caused by the cable (the remaining features are identified using the same numerical references used above in the first embodiment).

In this embodiment, the metal body is not needed as the PCB 12 and integrated accelerometer sensor chip 14 are properly aligned in the mold before encapsulation occurs. However, the body 82 can also include metal threading over the overmolding 82 (similar to the threading shown in FIGS. 2-5) for installation into the aperture 38 of machine 36 as described in the first embodiment device 10 as shown in FIG. 6, or it can have a generally smooth surface configured for installation using adhesive or other appropriate material. The overmolding 82 provides additional benefits as it results in a smaller, lightweight, and less expensive device 80.

While particular embodiments of the present MEMS accelerometer device have been described herein, it is noted that other embodiments are considered which, for example, incorporate one or more features from one or more different embodiments. Further, it will be appreciated by those skilled in the art that changes and modifications may be made thereto without departing from the invention in its broader aspects and as set forth in the following claims.

The invention claimed is:

1. A MEMS accelerometer device for use with a machine having a housing, and an external data acquisition system, the device comprising: a stud defining a chamber and having a threaded body configured to fasten into a threaded aperture of the machine; a printed circuit board disposed in said chamber; an accelerometer sensor chip mounted on and electrically connected to said printed circuit board; and a communication device electrically connected to said printed circuit board and configured for providing measurement data to the data acquisition system.

2. The MEMS accelerometer device of claim 1 wherein said stud further includes a head adjacent to said threaded body, said head having an opening in fluid communication with said chamber, wherein said communication device is a cable attached at one end to said printed circuit board, and wherein said cable extends through said opening for attachment by a second end to the external data acquisition system.

3. The MEMS accelerometer device of claim 1 wherein said communication device is a wireless transmitter and is configured for providing measurement data to a wireless receiver coupled to the data acquisition system.

4. The MEMS accelerometer device of claim 1 wherein an axis of said accelerometer sensor chip is parallel to a longitudinal axis of said stud, whereby said accelerometer sensor chip is vertically aligned regardless of the rotational position of the device about said longitudinal axis.

5. The MEMS accelerometer device of claim 1 further including a temperature sensor mounted on and electrically connected to said printed circuit board in a lower portion of said chamber, whereby said temperature sensor is disposed below a surface of the housing and inside the machine when said threaded body is fastened into the aperture in the machine.

6. The MEMS accelerometer device of claim 1 further including a second accelerometer sensor chip mounted on and electrically connected to said printed circuit board, and a third accelerometer sensor chip mounted on and electrically connected to said printed circuit board, wherein each said accelerometer sensor chip measures acceleration in a corresponding X, Y, and Z direction.

7. The MEMS accelerometer device of claim 6 wherein said accelerometer sensor chip is mounted on said second portion of said printed circuit board, and said second and third accelerometer chips are mounted on said first portion of said printed circuit board.

8. The MEMS accelerometer device of claim 1 wherein said printed circuit board includes a first portion and second portion, wherein each said portion has an outer surface defining a plane, and wherein said portions are disposed such that said planes are generally transverse to each other.

9. The MEMS accelerometer device of claim 1 wherein said device further includes a jam nut for securing the stud to the housing.

10. The MEMS accelerometer device of claim 1 wherein said chamber is configured to grippingly receive and retain said printer printed circuit board.

11. A MEMS accelerometer device for use with a machine, and an external data acquisition system, the device comprising: a printed circuit board; an accelerometer sensor chip mounted on and electrically connected to said printed circuit board; a communication device electrically connected to said printed circuit board and configured for providing measurement data to the data acquisition system; and an overmolding encapsulating said printed circuit board, said overmolding being configured to engage the aperture of the machine.

12. The MEMS accelerometer device of claim 11 wherein said device further includes a grommet adjacent to said overmolding, said grommet having an opening in fluid communication with said chamber, wherein said communication device is a cable attached at one end to said printed circuit board, and wherein said cable extends through said opening for attachment by a second end to the external data acquisition system.

13. The MEMS accelerometer device of claim 11 wherein said overmolding includes a threaded outer surface configured for engaging threading on the aperture.

14. The MEMS accelerometer device of claim 11 further comprising a second accelerometer sensor chip mounted on and electrically connected to said printed circuit board, and a third accelerometer sensor chip mounted on and electrically connected to said printed circuit board, wherein each said accelerometer sensor chip measures acceleration in a corresponding X, Y, and Z direction.

15. The MEMS accelerometer device of claim 11 wherein said printed circuit board includes a first portion and second portion, wherein each said portion has an outer surface defining a plane, and wherein said portions are disposed such that said planes are generally transverse to each other.

16. The MEMS accelerometer device of claim 15 wherein said accelerometer sensor chip is mounted on said second portion of said printed circuit board, and said second and third accelerometer chips are mounted on said first portion of said printed circuit board.

17. The MEMS accelerometer device of claim 11 wherein an axis of said accelerometer sensor chip is parallel to a longitudinal axis of said overmolding, whereby said accelerometer sensor chip is vertically aligned regardless of the rotational position of said device about said longitudinal axis.

18. A MEMS accelerometer device for use with a machine, and an external data acquisition system, the device comprising: a stud defining a chamber and having a threaded body; a printed circuit board disposed in said chamber and having first and second portions; a first accelerometer sensor chip configured for measuring acceleration in an X direction and mounted on and electrically connected to said printed circuit board second portion; a second accelerometer sensor chip configured for measuring acceleration in an Y direction and mounted on and electrically connected to said printed circuit board first portion; a third accelerometer sensor chip configured for measuring acceleration in an Z direction and mounted on and electrically connected to said printed circuit board first portion; and a communication device electrically connected to said printed circuit board and configured for providing measurement data to the data acquisition system.

19. The MEMS accelerometer device of claim 18 wherein said stud further includes a head adjacent to said threaded body, said head having an opening in fluid communication with said chamber, wherein said communication device is a cable attached at one end to said printed circuit board, and wherein said cable extends through said opening for attachment by a second end to the external data acquisition system.

20. The MEMS accelerometer device of claim 18 wherein each said portion has an outer surface defining a plane, and wherein said portions are disposed such that said planes are generally transverse to each other.

* * * * *